United States Patent
Ezrielev et al.

(10) Patent No.: US 12,158,817 B2
(45) Date of Patent: Dec. 3, 2024

(54) OPPORTUNISTIC BACKUPS THROUGH TIME-LIMITED AIRGAP

(71) Applicant: Dell Products L.P., Round Rock, TX (US)

(72) Inventors: Ofir Ezrielev, Be'er Sheba (IL); Jehuda Shemer, Kfar Saba (IL); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 104 days.

(21) Appl. No.: 18/046,628

(22) Filed: Oct. 14, 2022

(65) Prior Publication Data

US 2024/0126657 A1 Apr. 18, 2024

(51) Int. Cl.
*G06F 11/14* (2006.01)
(52) U.S. Cl.
CPC ...... *G06F 11/1456* (2013.01); *G06F 11/1451* (2013.01); *G06F 11/1461* (2013.01)
(58) Field of Classification Search
None
See application file for complete search history.

(56) References Cited

U.S. PATENT DOCUMENTS

| | | | | |
|---|---|---|---|---|
| 9,158,653 | B2* | 10/2015 | Gold | G06F 11/3433 |
| 10,503,610 | B1* | 12/2019 | Shemer | G06F 11/1464 |
| 2013/0318463 | A1* | 11/2013 | Clifford | G06F 11/1453 |
| | | | | 715/772 |
| 2019/0163589 | A1* | 5/2019 | McBride | G06F 9/5077 |
| 2019/0236274 | A1* | 8/2019 | Brenner | G06F 21/6245 |
| 2021/0019235 | A1* | 1/2021 | Savir | G06F 40/30 |
| 2022/0004485 | A1* | 1/2022 | Vijay | G06F 11/1464 |
| 2023/0168973 | A1* | 6/2023 | Radhakrishnan | G06F 11/1469 |
| | | | | 709/227 |

* cited by examiner

*Primary Examiner* — Charles Rones
*Assistant Examiner* — Ralph A Verderamo, III
(74) *Attorney, Agent, or Firm* — Workman Nydegger

(57) ABSTRACT

Opportunistically transmitting backups through a time-limited air gap. A data protection system may predict rates of changes for one or more applications. The predicted rate of change allows a size of corresponding backups to be estimated. If there is time during which an air gap is available (closed), at least of the backups is selected and opportunistically transmitted to a vault through the air gap.

20 Claims, 4 Drawing Sheets

OPPORTUNISTIC BACKUPS THROUGH TIME-LIMITED AIRGAP

FIELD OF THE INVENTION

Embodiments of the present invention generally relate to data protection systems and operations. More particularly, at least some embodiments of the invention relate to systems, hardware, software, computer-readable media, and methods for data protection operations in protected systems including air gapped backup systems.

BACKGROUND

Most entities rely on applications and data for operational purposes. Hospitals, for example, have applications that require/use/generate data related to patients, medicines, procedures, and the like. Airlines rely on applications and data to manage flights, passengers, employees, and more. Much of this data is confidential and business critical.

These entities exert substantial efforts to ensure that their data is protected and available when needed. These efforts include generating backups of the production systems/data.

More generally, most entities and individuals take some precautions to protect their data. Data protection is achieved using backup systems. Backup systems are available in many flavors and offer different levels of protection. Some backup systems, for example, try to ensure that backups are very recent. Others may perform backups at a slower schedule. Some backup systems are configured to protect the backups by controlling access to the backups. Some backup systems are only accessible at certain times. As a result, the ability of systems to protect data may be limited to the time during which the backup system is available.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
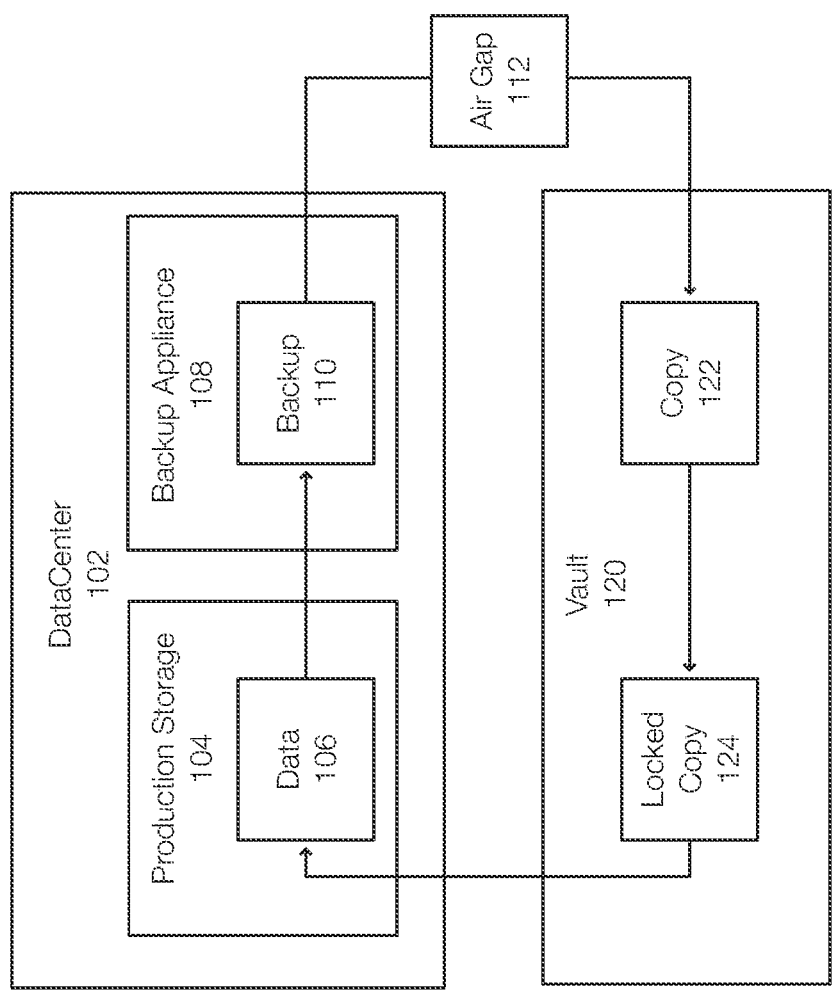
FIG. 1 discloses aspects of a data protection system that includes or has access to an air gapped vault.

Embodiments of the present invention generally relate to data protection systems and operations. More particularly, at least some embodiments of the invention relate to systems, hardware, software, computer-readable media, and methods for protecting data in backup systems such as air gapped vaults.

Embodiments of the invention relate to data protection operations including, by way of example, backup operations, restore operations, replication operations, vault options, opportunistic backup operations, or the like or combination thereof. Embodiments of the invention relate to opportunistically performing data protection operations including backup operations.

An air gapped backup system, which may be referred to as a vault, is a computing environment or system that is only connected to a network or to external systems at certain times that are controlled by the vault. When the air gap is closed (e.g., accessible to an external system or connected to a network), a data protection system may be able to write data (e.g., backups) from a source to a target in the vault. When the air gap is open (e.g., no external communication to the vault), data cannot be written to the vault.

The vault may be physically separated from other computing equipment and only connected to external systems when a physical connection is established (the air gap is closed). Alternatively, the vault may be a portion of a data center configured as a vault. In this example, communication is not permitted even if a physical or wireless connection exists to the vault. Thus, the air gap may be a connection or connections over which communication such as data transmission is either allowed or prevented. The vault may be able to perform operations on any data stored within the vault.

An air gapped vault may present a limited window to perform data protection operations such as backup operations. Thus, a data protection system, such as a backup appliance operating at a source, may be configured to transmit backups to the vault when the air gap is closed. The air gap may be closed for a specified period of time that may be known to the data protection system. Embodiments of the invention take advantage of situations where extra time is available, and all necessary transmissions have been performed.

For example, the data protection system may transfer a particular backup when the air gap is closed. If that backup is transferred and the air gap is still closed, the data protection system may select addition data to transfer to the vault. Thus, the data protection system opportunistically performs backup operations. The data or backups that are opportunistically transferred by the data protection system to the vault may be identified or selected based on various factors including, but not limited to, rate of change, rate of change ratio, and/or the possible information transfer amount (PITA), which is the amount of data that can be transferred for any remaining time during which the air gap is closed. This may be based on bandwidth, estimated or predicted bandwidth, and time during which the air gap will be closed.

FIG. 1 discloses aspects of a data protection system configured to store data in a vault accessed via an air gap. FIG. 1 illustrates a datacenter 102 that includes production storage 104, which stores production data 106. The datacenter 102 may also host applications associated with the data 106. The production data 106 may include data required or accessed by users, applications, or the like. The data 106 may include files, objects, blocks, a database, emails, images, videos, documents, spreadsheets, presentations, or the like or combination thereof.

Although FIG. 1 illustrates production storage 104 of a datacenter 102, the production storage 104 may be an on-premise storage system, an edge system storage, or the like or combination thereof. The production storage 104 may include storage devices such as hard disk drives.

A backup appliance 108, which is an example of a data protection system, is configured to generate and store backups of the data 106 (and/or applications), represented as the backup 110. The backup 110 may be a full backup, a synthetic backup, incremental backups, snapshots, or the like. The backup appliance 108 may be a virtual appliance or a physical appliance. The backup appliance 108, alternatively, may be configured in storing the backup 110 in the vault 120. Thus, the backup data may be temporarily stored in the backup appliance 108 until transferred to the vault 120.

More generally, a data protection system may protect applications, which includes the application's data. Thus, the backup 110 may include the application, the application's data, or other data required to recover the production system.

The backup appliance 108 may transmit the backup 110 to a vault 120, which may be protected by or access through an air gap 112 controlled by the vault 120. This allows a copy 122 of the data 106 to be stored in the vault 120 only when a connection is available (e.g., the air gap 112 is configured to allow communications between the vault 120 and an external system or device such as the backup appliance 110). Data transmission to the vault 120 is possible when the air gap 112 is closed and data transmission is not possible when the air gap is open.

After the backup 110 is ingested into the vault 120 as the copy 122, the copy 122 is locked to generate a locked copy 124. The locked copy 124 is immutable in one example. The vault 120 may be created in the datacenter 102 or in another location that is remote from the data 106 and/or the backup appliance 108.

During a recovery operation, the data 106 may be recovered from the locked copy 124 (or other backup in the vault 120). In some examples, the data 106 may be recovered from the locked copy 124 or the copy 122 if necessary (and if retained). In one example, the backup 110 may be a namespace that is backed up to a namespace in the vault 120. The backup 110 may be transmitted to a namespace in the vault 120 as the copy 122. Next, the copy 122 may be copied to another namespace and retention locked, which results in the locked copy 124.

In one example, the vault 120 may be a target site configured to store backups received from the backup appliance 108. The vault 120 may be associated with or include a corresponding backup appliance that may be configured to store the backups in the target site and also perform restore or recover operations.

Figure 2:
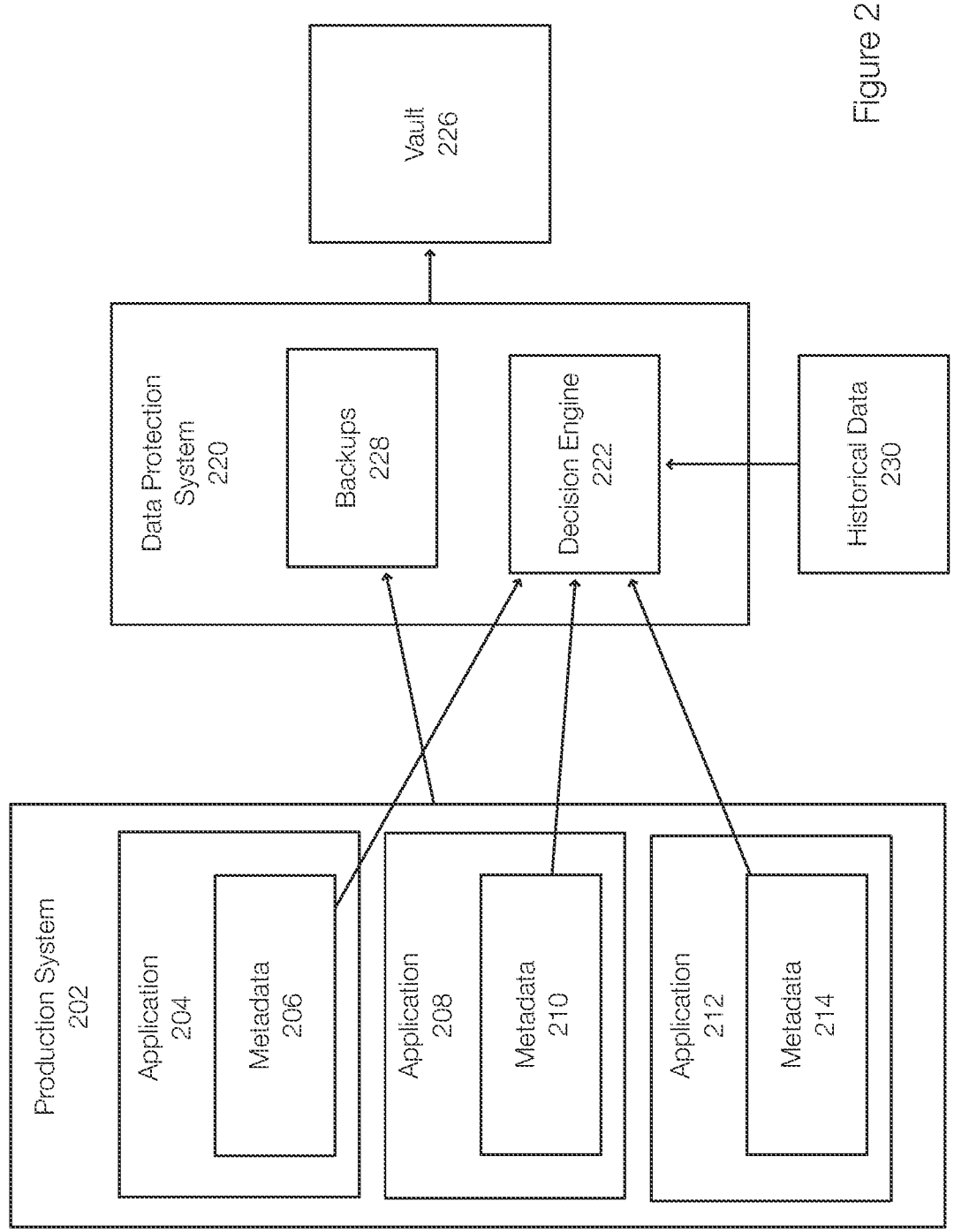
FIG. 2 discloses aspects of opportunistically backing up data to an air gapped vault.

FIG. 2 discloses aspects of opportunistic backup operations. FIG. 2 illustrates a production system 202 that includes applications 204, 208, and 212 (and their data). The applications are associated with, respectively, metadata 206, 210, and 214.

In one example, the applications 204, 208, and 212 may have different backup schedules and/or backup priorities. One task of the data protection system 220 is to transmit the backups 228, which may include backups of each of the applications 204, 208, and/or 212 and/or their data, to the vault 226. As previously discussed, this may be difficult because the availability of the vault 226 is constrained by an air gap.

As such, the data protection system 220 may schedule the application 204 for backup and transmission of the corresponding backup to the vault 226 for various reasons, such as a priority, based on a schedule, or the like.

If transmission of the backup of the application 204 completes and the air gap is still closed, a decision engine 222 is configured to select and transmit backups of other applications, such as backups of the applications 208 and 212 to the vault 226.

The decision engine 222 may use metadata, such as the metadata 206, 210, and 214, to select a backup for transmission. The decision engine 222 may include, by way of example, a machine learning model with a quantile regression time series machine learning model. Quantile regression adds a probabilistic view to opportunistic transfers. For example, quantile regression allows the data protection system to estimate or determine the probability of changes to an application exceeding probable PITA values. Quantile regression can establish relationships between the predicted rate of change (and expected size of data to be backed up) and PITA. In one example, the decision engine may include a quantile regression model that can generate these probabilities. When selecting a backup to transmit opportunistically, the backup selected may be based on the probability of whether the data size will exceed the probable PITA.

More specifically, the model (e.g., the decision engine 222) may be trained using historical data 230. The historical data 230 may include time series data that is related to the rate at which data changes for each of the applications 204, 208, and 212. This allows patterns in the rate of change of each of the applications 204, 208, and 212 to be learned. When the decision engine 222 is deployed, inputs from the applications, such as the metadata 206, 210, and 214 or features derived therefrom, are used to generate inferences or predictions.

For example, the decision engine 222 may receive time series data that is related to rate at which data changes. For example, the decision engine 222 may infer that the application 204 should be prioritized for opportunistic backup based on a change or increase in the rate of change or based on the rate of change ratio (e.g., a ratio between the amount of data that has changed and the overall size of the application). The decision engine 222 may predict an expected rate of change and/or an expected rate of change ratio for each of the applications.

The rate of change may allow a size of the backup (e.g., an incremental backup) to be estimated. The rate of change multiplied by the time since the last backup may result in an estimated size of the backup to be transmitted for each of the applications 204, 208, and 212. Thus, using the predicted rate of change generated by the decision engine 222, the data protection engine 220 may select a specific backup to transmit to the vault 226. The decision engine 222 may also infer the possible information transfer amount or PITA.

In addition, a rate of change ratio, which describes the amount of data changed relate to the overall size of the data may be used by the decision engine or learned by the decision engine 222. Further, the decision engine 222 may also account for rewrites. Rewrites, in one example, may result in a higher functional change to the data, but does not necessarily lead to a higher differential size. Thus, the total amount of data to be transferred is impacted by both the rate of change and rewrites to the data. Data that is rewritten (or overwritten) may impact the rate of change but does not necessarily impact the size of the data included in the backup.

If free time is available (the air gap is still closed), the decision engine 222 may identify a backup to be transmitted. Further, the data protection system 220, using the output of the decision engine 222, may select data or backups that can be transmitted successfully.

More specifically, the data protection system 220 may select a backup whose size is less than PITA. The data protection system 220 may also consider the rate of change ratio and select a backup that has a higher rate of change ratio. Other factors, such as time since last backup may also be considered by the data protection system 220.

In another example, the data protection system 220 may consider historical rate of changes. If the rate of change for an application is high and if the addition of a predicted rate of change indicates that the data to be transferred for a particular application will exceed PITA, the data protection system 220 may opt to protect the application now because delaying may result in a large amount of data to be transferred and which cannot be accomplished in the time available. This may adversely impact the extent to which the application is protected.

Embodiments of the invention allow applications to be protected in an opportunistic manner. This advantageously allows data to be protected without having to extend the time during which the air gap is closed. Thus, the data in the vault is more securely protected than it would be if the air gap were closed for a longer period of time.

Figure 3:
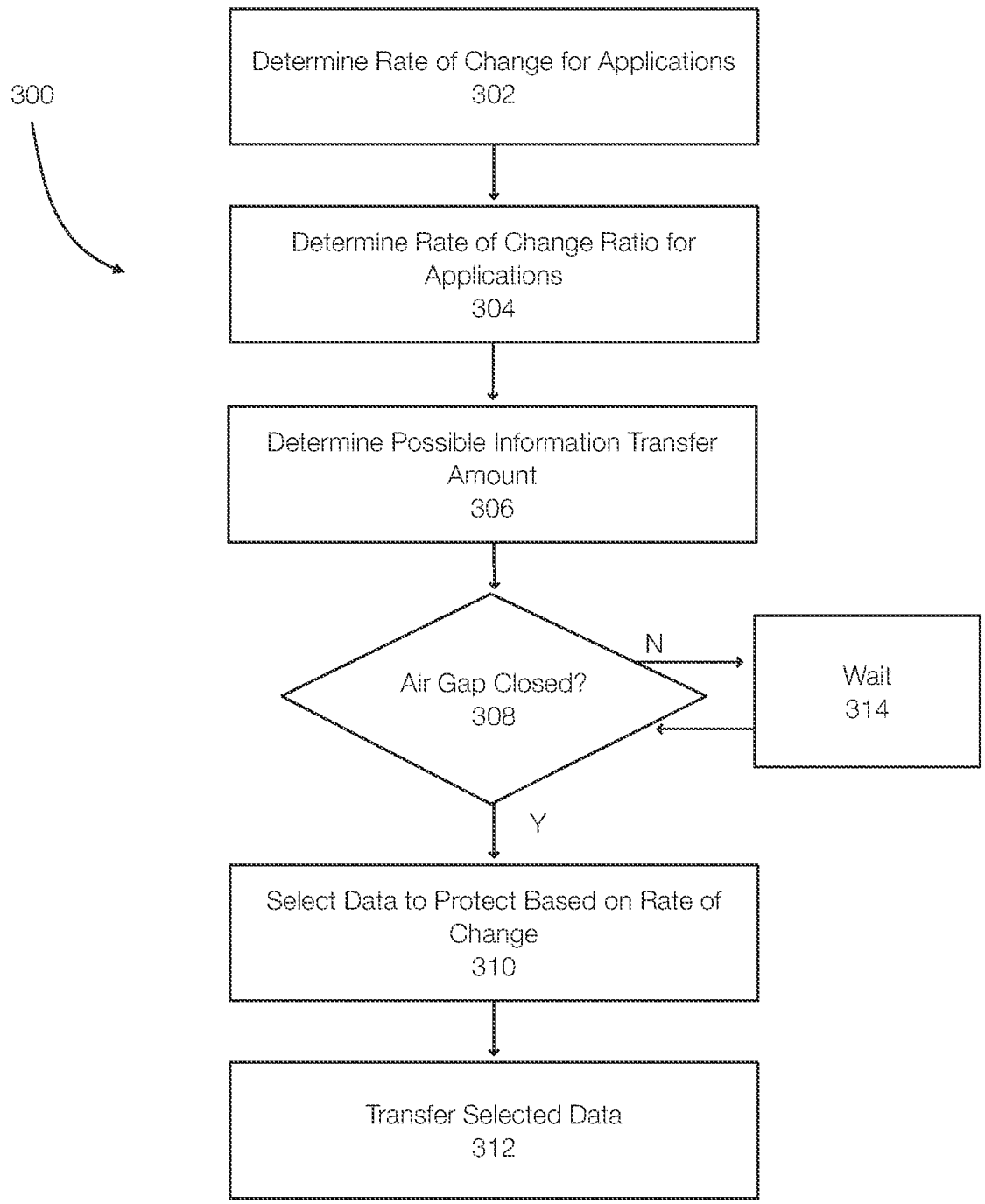
FIG. 3 discloses aspects of performing time restricted data protection operations.

FIG. 3 discloses aspects of opportunistic backups through a time limited air gap. The method 300 may being by determining 302 a rate of change for each application being protected. This characteristic may be determined in accordance with the manner in which data is protected. For example, if data is protected on a per volume or group of volumes basis, then the rate of change may be determined for each volume or each group of volumes. Thus, embodiments of the invention may determine a rate of change for a component, which represents an application, a volume, a group of volumes, of the like or combination thereof. In addition, determining the rate of change 302 may include inferring the rate of change based on input data to a machine learning model that has been trained with historical rates of change.

Next, a rate of change ratio is determined 304 for each of the applications (volumes, disks, etc.). This may be determined using the inferred or predicted rate of change. Next, the possible information transfer amount (PITA) is determined 306.

If the air gap is closed (Y at 308), the method may select 310 data to protect, or transfer based on the predicted rate of change for each application. The predicted rate of change allows the data protection system to evaluate each of the applications. More specifically, the data protection engine can determine how much data needs to be transferred for each application using the expected or predicted rate of change. The expected or predicted rate of change also allows the rate of change ratio for each application to be estimated. The data to be transferred is selected based on these factors and/or PITA. The data protection system may also consider other factors such as whether the amount of data to transfer will exceed PITA if the data is not transferred now. The importance of the data may also be a factor. Another factor is how much time has passed since it may be beneficial to ensure that every application is backed up at times even when their relative importance is low. The time since most recent backup may increase the importance of performing a backup.

Using this information, the method 300 then selects 310 data to protect and transmit opportunistically to the vault. Once data is selected, the selected data is transferred 312. If the air gap is open (N at 308) or if the air gap is closed and data is currently being transmitted through the air gap, the method 300 may wait 314 until the air gap is not being used and will still be closed for some amount of time. Depending on the expected sizes, the data protection system may be able to transmit multiple backups opportunistically.

By way of example, the decisions made by the data protection system, based on the predicted rate of change for each of the applications, include whether the amount of data to be transferred is less than the amount of data that is possible given the remaining time the air gap is closed. Applications associated with a higher rate of change ratio may be prioritized for selection. Finally, whether waiting will lead to a situation where the size of the data to transmit is too large is considered.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, container, or virtual machines (VM), though no particular component implementation is required for any embodiment.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: determining a rate of change for each component protected by a data protection system, determining a possible information transfer amount based on an amount of time that an air gap associated with a vault is closed, selecting a backup to transfer to the vault, and transmitting the backup to the vault while the air gap is still closed and other required data transfers for a recovery operation to the vault have completed.

Embodiment 2. The method of embodiment 1, further comprising determining a rate of change for each component protected by the data protection system.

Embodiment 3. The method of embodiment 1 and/or 2, wherein the component comprises an application and/or data of the application or wherein the component comprises a volume or a group of volumes.

Embodiment 4. The method of embodiment 1, 2, and/or 3, w wherein the rate of change and the possible information transfer amount are generated as output probabilities of a machine learning model.

Embodiment 5. The method of embodiment 1, 2, 3, and/or 4, wherein determining the rate of change comprises predicting the rate of change for each component with the machine learning model.

Embodiment 6. The method of embodiment 1, 2, 3, 4, and/or 5, further comprising training the machine learning model using historical data for each component, wherein the historical data includes time series rate or change data for each component and wherein the machine learning model is a quantile regression machine learning model.

Embodiment 7. The method of embodiment 1, 2, 3, 4, 5, and/or 6, wherein a size of the selected backup is less than the possible information transfer amount, wherein the possible information transfer amount is based on a bandwidth of the vault and a time during which the vault remains open.

Embodiment 8. The method of embodiment 1, 2, 3, 4, 5, 6, and/or 7, wherein the selected backup has a higher rate of change ratio than other backups available for selection.

Embodiment 9. The method of embodiment 1, 2, 3, 4, 5, 6, 7, and/or 8, wherein the selected backup has a predicted rate of change indicating that a size of the selected backup will be too large if backup of the selected backup is delayed.

Embodiment 10. The method of embodiment 1, 2, 3, 4, 5, 6, 7, 8, and/or 9, further comprising transferring all backups opportunistically without increasing a time during which the air gap is normally closed.

Embodiment 11. A method for performing any of the operations, methods, or processes, or any portion of any of these, or combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
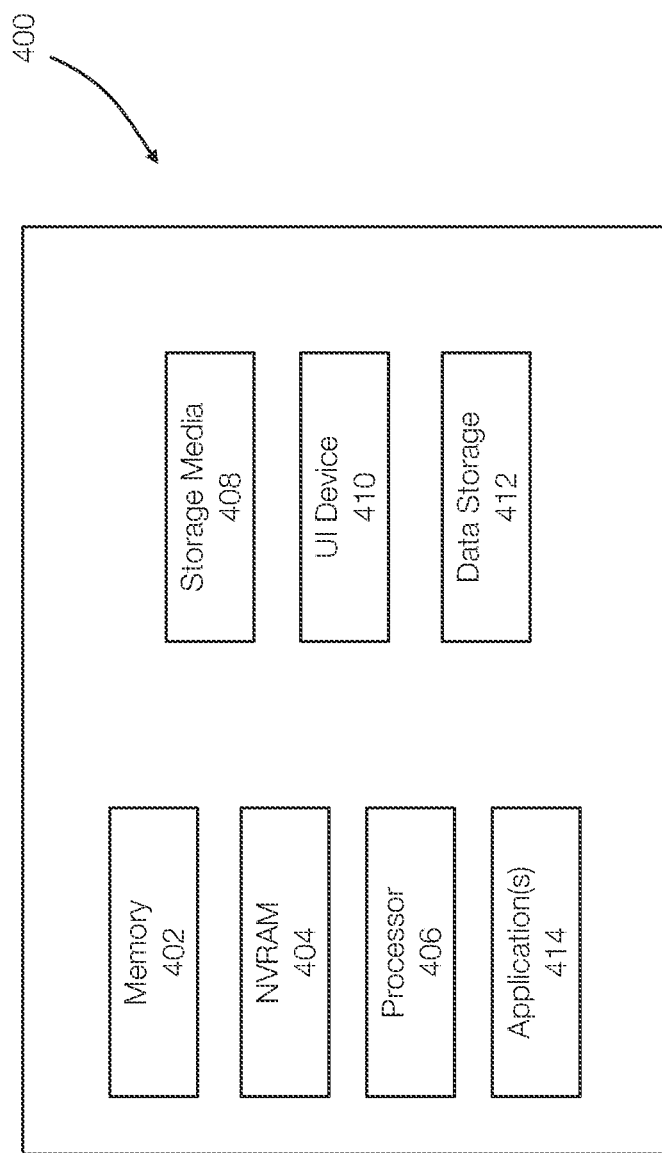
FIG. 4 discloses aspects of a computing entity, device, or system.

With reference briefly now to FIG. 4, any one or more of the entities disclosed, or implied, by the Figures, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid-state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    determining a rate of change for components protected by a data protection system;
    determining an amount of data that needs to be transferred for each of the components based on the corresponding rate of change;
    determining a possible information transfer amount based on an amount of time that an air gap associated with a vault is closed, wherein the possible information transfer amount is based on a bandwidth of the vault and a time during which the vault remains open;
    selecting a backup of at least one of the components to transfer to the vault based on factors that include the amount of data that needs to be transferred for each of the components and the possible information transfer amount; and
    transmitting the selected backup to the vault while the air gap is closed.

2. The method of claim 1, further comprising wherein the factors further include whether the amount of data to transfer exceeds the possible information transfer amount, time since transferring a most recent backup for each of the components and/or data importance for each of the components.

3. The method of claim 1, wherein each of the components comprises an application and/or data of the application or wherein each of the components comprises a volume or a group of volumes.

4. The method of claim 1, wherein the rate of change and the possible information transfer amount are generated as output probabilities of a machine learning model.

5. The method of claim 4, wherein determining the rate of change comprises predicting the rate of change for each of the components with the machine learning model.

6. The method of claim 5, further comprising training the machine learning model using historical data for each of the components, wherein the historical data includes time series rate or change data for each of the components and wherein the machine learning model is a quantile regression machine learning model.

7. The method of claim 1, wherein a size of the selected backup is less than the possible information transfer amount.

8. The method of claim 1, wherein the selected backup has a higher rate of change ratio than other backups available for selection, wherein the rate of change ratio is a ratio between the amount of data that changed and an overall size of the data.

9. The method of claim 1, wherein the selected backup has a predicted rate of change indicating that a size of the selected backup will be too large if backup of the selected backup is delayed.

10. The method of claim 1, further comprising transferring all backups opportunistically without increasing a time during which the air gap is normally closed.

11. A non-transitory storage medium having stored therein instructions that are executable by one or more hardware processors to perform operations comprising:
    determining a rate of change for components protected by a data protection system;
    determining a amount of data that needs to be transferred for each of the Components based on the corresponding rate of change;
    determining a possible information transfer amount based on an amount of time that an air gap associated with a vault is closed, wherein the possible information transfer amount is based on a bandwidth of the vault and a time during which the vault remains open;
    selecting a backup of at least one of the components to transfer to the vault based on factors that include the amount of data that needs to be transferred for each of the components and the possible information transfer amount; and
    transmitting the selected backup to the vault while the air gap is closed.

12. The non-transitory storage medium of claim 11, further comprising wherein the factors further include whether the amount of data to transfer exceeds the possible information transfer amount, time since transferring a most recent backup for each of the components and/or data importance for each of the components.

13. The non-transitory storage medium of claim 11, wherein each of the components comprises an application and/or data of the application or wherein each of the components comprises a volume or a group of volumes.

14. The non-transitory storage medium of claim 11, wherein the rate of change and the possible information transfer amount are generated as output probabilities of a machine learning model.

15. The non-transitory storage medium of claim 14, wherein determining the rate of change comprises predicting the rate of change for each of the components with the machine learning model.

16. The non-transitory storage medium of claim 15, further comprising training the machine learning model using historical data for each of the components, wherein the historical data includes time series rate or change data for each of the components and wherein the machine learning model is a quantile regression machine learning model.

17. The non-transitory storage medium of claim 11, wherein a size of the selected backup is less than the possible information transfer amount.

18. The non-transitory storage medium of claim 11, wherein the selected backup has a higher rate of change ratio than other backups available for selection.

19. The non-transitory storage medium of claim 11, wherein the selected backup has a predicted rate of change indicating that a size of the selected backup will be too large if backup of the selected backup is delayed.

20. The non-transitory storage medium of claim 11, further comprising transferring all backups opportunistically without increasing a time during which the air gap is normally closed.

* * * * *